Feb. 28, 1956     F. R. SHONKA     2,736,818
MEASURING DEVICE AND APPARATUS
Filed Feb. 29, 1952
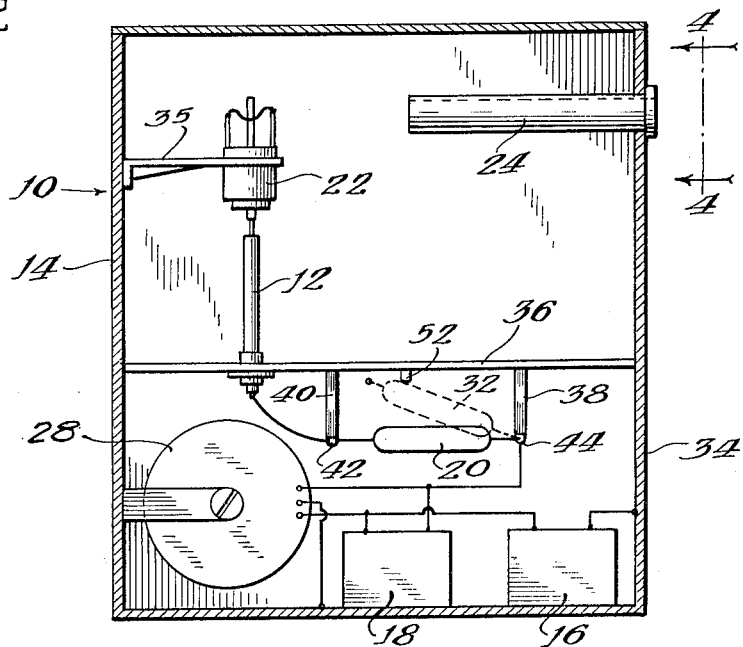
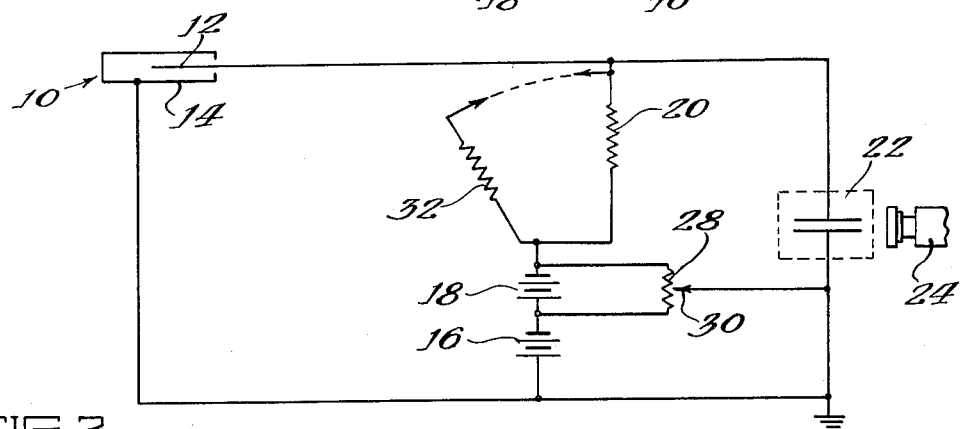
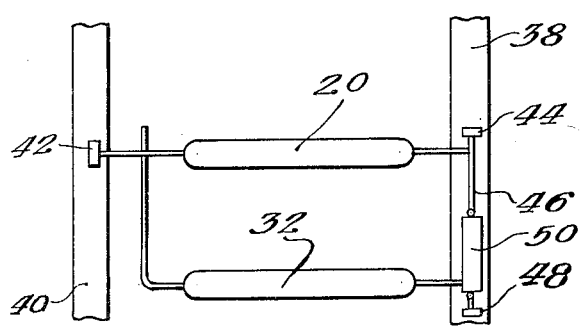
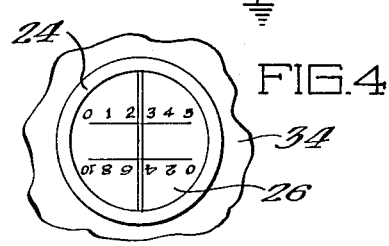
INVENTOR.
Francis R. Shonka
BY
Roland A. Anderson
Attorney

United States Patent Office 2,736,818
Patented Feb. 28, 1956

2,736,818

MEASURING DEVICE AND APPARATUS

Francis R. Shonka, Riverside, Ill., assignor to the United States of America as represented by the United States Atomic Energy Commission Application February 29, 1952, Serial No. 274,224

1 Claim. (Cl. 250—83.6)

This invention relates generally to measuring apparatuses, and more specifically to measuring apparatuses which provide a plurality of sensitivities.

Most of the measuring instruments known to the art which do provide a plurality of sensitivities require mental interpretation of the indications produced by the instruments, since only a single scale is provided to calibrate the indications of the instrument in terms of standard measurement units. The instruments presently in use in the art which do have a plurality of sensitivities and may be read directly in terms of known measurement units generally have mechanical means for changing the scales upon the instrument. Such mechanical scale changing means add to the cost of the instrument, increase its bulk and weight, and are difficult to install and keep in good operating condition.

For these reasons, portable measuring instruments are generally provided with a single scale, hence requiring the indications of the instrument to be interpreted if more than one sensitivity is available. This is particularly true of portable radiation measuring instruments, which generally require considerable bulk and weight even without mechanical scale changing means. Scale changing devices have been thought to be too cumbersome, bulky and heavy for use in such portable radiation measuring instruments.

It is therefore an object of the present invention to provide apparatus for effecting changes in the sensitivity of an instrument and which produces a visual indication of the measurement directly in terms of an established standard, without requiring mental interpretations of the indications or mechanical scale changing means, particularly a portable radiation measuring instrument with these characteristics.

Other objects and advantages of the present invention will become readily apparent to the man skilled in the art from a further reading of the present specification and claim, particularly when viewed in the light of the drawings, in which:

Figure 1 is a schematic electrical diagram of a radiation measuring instrument constructed according to the present invention;

Figure 2 is a sectional view, somewhat diagrammatic, of a radiation measuring instrument constructed with the electrical circuit shown in Figure 1;

Figure 3 is a fragmentary bottom view of a portion of the radiation measuring instrument shown in Figure 2; and Figure 4 is a fragmentary view taken along line 4—4 of Figure 1 showing the indicating means of the instrument in elevation.

Referring to the electrical circuit diagram of Figure 1, an ionization chamber 10 has an inner electrode 12 and an outer electrode 14. The ionization chamber 10 is connected in a series circuit with batteries 16 and 18 and resistor 20. An electrometer 22 is connected across the ionization chamber 10, and is provided with a viewing tube 24 having a scale 26. A rheostat 28 is connected across battery 18, and has a tap 30 connected to the outer electrode 14 of the ionization chamber 10. A second ionization chamber resistor 32 is connected at one end to the junction point of battery 18 and resistor 20, and the other end of resistor 32 is adapted to be connected to the inner electrode 12 of the ionization chamber 10, as will hereinafter be described.

A physical embodiment of the electrical circuit described above is shown in Figures 2, 3 and 4. A casing 34 of electrically conducting material, such as copper, is used to support the electrical elements and the viewing tube 24 of the radiation measuring instrument. The casing 34 is provided with a partition 36 which is also constructed of electrically conducting material. The inner electrode 12 of the ionization chamber 10 is insulatingly mounted to the partition 36 within the casing 34, and is in the form of a rod. In this manner, the ionization chamber 10 is formed by the inner electrode 12 and the portion of the casing 34 surrounding the inner electrode 12 which comprises the outer electrode 14. One of the elements of the electrometer 22 is attached to the inner electrode 12, and the other element of the electrometer is electrically connected to the casing 34 by means of a bracket 35. The electrometer 22 is more fully described in the copending patent application of Francis R. Shonka and Anthony J. Okleshen, Serial No. 225,635, filed May 10, 1951, now abandoned, and the continuation in part of the application, S. N. 423,264, filed April 14, 1954. The viewing tube 24 extends through the casing 34 into the ionization chamber 10 and focuses upon the electrometer 22.

Ribs 38 and 40 constructed of electrically insulating material are mounted to the partition 36 on the opposite side of the ionization chamber 10. Resistor 20 is mounted to the ribs 38 and 40 by means of lugs 42 and 44, lug 42 being connected to the inner electrode 12 of the ionization chamber 10. Lug 44 is connected to battery 18 and rheostat 30. Battery 16 and battery 18 are connected in series between lug 44 and the casing 34 of the instrument.

An electrically conducting bar 46 is connected between lug 44 and lug 48 on rib 38. A rotatable sleeve 50 is disposed about the bar 46, and one of the pigtails of resistor 32 is rigidly secured to the sleeve 50 allowing resistor 32 to rotate. The other pigtail of resistor 32 is bent to cross the pigtail of resistor 20, thereby forming a stop to the rotation of resistor 32. An electrical insulator 52 is mounted to the partition 36 adjacent to resistor 32 and forms a second rotational stop for resistor 32. Resistor 32 is selected to have a smaller resistance than resistor 20.

When radiations fall upon the ionization chamber 10, the medium within the ionization chamber becomes ionized, and the positive ions are collected by the negative inner electrode 12. This results in the flow of current through resistor 20, battery 18 and battery 16, thereby developing a voltage across resistor 20. Since the electrometer 22 is connected across resistor 20 and a portion of rheostat 28, the change in the potential drop across resistor 20 will change the indication of the electrometer 22, and in this manner indicate the magnitude of the radiations falling upon the ionization chamber 10. When these radiations cease, batteries 16 and 18 will recharge the ionization chamber 10 to their combined potential, and the voltage drop appearing across resistor 20 will disappear. Hence, the electrometer will then again register a zero radiation indication.

When the radiation measuring instrument is placed in the position shown in Figure 2, resistor 32 will be connected in parallel with resistor 20 due to the attraction of gravity upon resistor 32. Hence, the total resistance R of the combined resistors 20 and 32 will be given by the equation:

$$\frac{1}{R} = \frac{1}{r_1} + \frac{1}{r_2}$$

where $r_1$ and $r_2$ are resistors 20 and 32. It is thus clear, that any given ion current will develop less voltage across resistors 20 and 32 when these two resistors are connected in parallel, as shown in Figures 2 and 3, than it would across resistor 20 alone, resistor 20 having the greater impedance. The sensitivity of the instrument is therefore a minimum when positioned as shown in Figures 2 and 3, resistors 20 and 32 being connected in parallel. If the instrument is inverted, gravity will cause resistor 32 to become disconnected from resistor 20 and rotate to the dotted position shown in Figure 2. Then, the higher impedance of resistor 20 will develop a much larger voltage in response to ionization currents than would the parallel connected resistors 20 and 32, and the radiation instrument is in its most sensitive position.

It is also to be noted, that the viewing tube 24 is provided with a double scale 26, the one scale being inverted from the other scale. Hence, when the instrument is in the upright position shown in Figure 2, the upright scale may be directly calibrated in terms of standard radiation units, and when the instrument is inverted, the then upright scale may be directly calibrated in standard units for the more sensitive instrument. It is thus clear, that inverting the instrument both changes the sensitivity of the instrument and provides a different upright scale which may be directly calibrated in terms of standard radiation units.

In one particular embodiment of the present invention, resistor 20 was approximately $1 \times 10^{12}$ megohms, and resistor 32 was approximately $5 \times 10^8$ megohms. Batteries 16 and 18 had a combined voltage of approximately 60 volts.

The foregoing description of the invention has been specific, and obviously has many applications within the inventive scope beyond that described. For this reason, it is intended that the scope of the present invention be not limited to the instrument specifically disclosed, but rather only by the appended claim.

What is claimed is:

A radiation measuring device comprising, in combination, an ionization chamber circuit including in series, an ionization chamber, a source of electrical potential, and an electrical impedance, means to visually indicate the potential drop across the electrical impedance of the ionization chamber circuit, said means being provided with parallel scales on a common surface, one scale being inverted with respect to the other, and a second electrical impedance having one end pivotally mounted and electrically connected to one end of the impedance in the ionization chamber circuit, an electrical contact disposed at the other end of the second impedance, and a stationary electrical contact electrically connected to the other end of the impedance in the ionization chamber circuit, said stationary electrical contact being positioned on a plane normal to the scales of the visual indicating means and traversing the pivot point of the second electrical impedance.

References Cited in the file of this patent

UNITED STATES PATENTS

| | | |
|---|---|---|
| 1,617,145 | Brown | Feb. 8, 1927 |
| 1,623,571 | Bellman | Apr. 5, 1927 |
| 1,692,155 | Brownell | Nov. 20, 1928 |
| 1,777,665 | Gibson | Oct. 7, 1930 |
| 1,933,063 | Kolhorster | Oct. 13, 1933 |
| 2,043,495 | Sanger | June 9, 1936 |
| 2,103,606 | Abramsohn et al. | Dec. 28, 1937 |
| 2,168,464 | Yeda | Aug. 8, 1939 |
| 2,265,966 | Gebauer | Dec. 9, 1941 |
| 2,454,042 | Dettinger | Nov. 16, 1948 |
| 2,503,383 | Gesswein | Apr. 11, 1950 |
| 2,516,334 | Neufeld | July 25, 1950 |
| 2,597,188 | Rozett | May 20, 1952 |

FOREIGN PATENTS

| | | |
|---|---|---|
| 56,224 | Denmark | May 30, 1939 |
| 933,178 | France | Apr. 13, 1948 |

OTHER REFERENCES

Publication I, War Dept. Technical Manual, T. M. 11-1244, "Voltmeter IS-189," Mar. 22, 1945.